(12) United States Patent
Lister et al.

(10) Patent No.: US 11,110,672 B2
(45) Date of Patent: Sep. 7, 2021

(54) EXERCISE WEIGHT STRUCTURE (71) Applicant: Escape Enviro Limited, Yorkshire (GB)

(72) Inventors: Gary Lister, Yorkshire (GB); Richard Januszek, Yorkshire (GB)

(73) Assignee: ESCAPE ENVIRO LIMITED, Yorkshire (GB)

( * ) Notice: Subject to any disclaimer, the term of this patent is extended or adjusted under 35 U.S.C. 154(b) by 20 days.

(21) Appl. No.: 16/712,170

(22) Filed: Dec. 12, 2019

(65) Prior Publication Data

US 2020/0114600 A1 Apr. 16, 2020

Related U.S. Application Data

(60) Continuation of application No. 16/026,186, filed on Jul. 3, 2018, now Pat. No. 10,543,650, which is a division of application No. 14/348,883, filed as application No. PCT/GB2012/052412 on Sep. 28, 2012, now Pat. No. 10,040,259.

(51) Int. Cl.
| | |
|---|---|
| *B29C 70/68* | (2006.01) |
| *A63B 21/06* | (2006.01) |
| *B29B 17/00* | (2006.01) |
| *A63B 21/072* | (2006.01) |

(52) U.S. Cl.
CPC .......... *B29C 70/68* (2013.01); *A63B 21/0601* (2013.01); *A63B 21/072* (2013.01); *B29B 17/0042* (2013.01); *A63B 2209/00* (2013.01); *Y02W 30/62* (2015.05)

(58) Field of Classification Search
CPC . A63B 21/075; A63B 21/072; A63B 21/0722; A63B 21/0724; A63B 21/0726; A63B 21/0728; A63B 21/0601; A63B 2209/00; A63B 21/06; B22F 3/225; B29C 45/00; B29C 45/00; B29C 43/00; B29C 70/68; B29B 17/0042; Y02W 30/62
See application file for complete search history.

(56) References Cited

U.S. PATENT DOCUMENTS

| 9,247 A | * | 9/1852 | Fitzgerald | ............ A01D 34/664 |
| | | | | 56/157 |
| 46,062 A | * | 1/1865 | Angenard | ............... C22C 30/00 |
| | | | | 106/1.21 |

(Continued)

FOREIGN PATENT DOCUMENTS

| EP | 1867365 | 12/2007 |
| GB | 2100969 | 1/1983 |

(Continued)

OTHER PUBLICATIONS

Search Report of GB1116781.4 dated Dec. 6, 2011.
ISR of PCT/GB2012/052412 dated Dec. 10, 2012.

*Primary Examiner* — Garrett K Atkinson
(74) *Attorney, Agent, or Firm* — Haley Guiliano LLP (57) ABSTRACT

A method of producing an exercise weight structure comprises mixing a particulate material with a binder material and molding the resulting mixture to an appropriate shape. An outer skin for the exercise weight structure is firstly formed of a resilient material, and forms a mold into which an inner weight section or body is molded or cast. The inner weight section and the outer skin are both formed of recycled material and include a common binder material.

9 Claims, 5 Drawing Sheets

(56) References Cited

U.S. PATENT DOCUMENTS

| | | | | |
|---|---|---|---|---|
| 1,867,365 | A * | 7/1932 | Lee | F16F 1/445 |
| | | | | 248/612 |
| 2,175,685 | A * | 10/1939 | Dieterich | A63B 37/00 |
| | | | | 473/363 |
| 2,439,221 | A * | 4/1948 | Rowland | D06M 15/15 |
| | | | | 427/443 |
| 3,490,766 | A * | 1/1970 | Gardner | A63B 21/065 |
| | | | | 482/105 |
| 3,883,629 | A * | 5/1975 | Garner | B29C 44/086 |
| | | | | 264/55 |
| 3,923,946 | A * | 12/1975 | Meyer | C22C 32/0094 |
| | | | | 419/48 |
| 4,113,480 | A * | 9/1978 | Rivers | B22F 3/22 |
| | | | | 419/2 |
| 4,621,808 | A * | 11/1986 | Orchard | A63B 21/0607 |
| | | | | 2/170 |
| 4,690,399 | A * | 9/1987 | Hayashi | A63B 21/075 |
| | | | | 482/108 |
| 4,917,946 | A * | 4/1990 | Grodski | B63C 11/30 |
| | | | | 428/212 |
| 5,665,014 | A * | 9/1997 | Sanford | B22F 3/225 |
| | | | | 473/345 |
| 6,005,041 | A * | 12/1999 | Cook | A63B 21/06 |
| | | | | 524/435 |
| 7,868,077 | B1 * | 1/2011 | Hines | A43B 19/005 |
| | | | | 524/413 |
| 8,858,405 | B2 * | 10/2014 | Agate | A63B 21/00043 |
| | | | | 482/106 |
| 9,359,467 | B2 * | 6/2016 | Leibler | C08G 83/008 |
| 9,833,653 | B2 * | 12/2017 | Bradford | A63B 23/12 |
| 2005/0046062 | A1 * | 3/2005 | Stevenson | B28C 7/0409 |
| | | | | 264/40.1 |
| 2006/0211547 | A1 * | 9/2006 | Lien | A63B 21/0728 |
| | | | | 482/93 |
| 2007/0184943 | A1 * | 8/2007 | Davies | A63B 21/0724 |
| | | | | 482/93 |
| 2008/0096738 | A1 * | 4/2008 | Kim | A63B 21/0726 |
| | | | | 482/108 |
| 2009/0227431 | A1 * | 9/2009 | Hsieh | A63B 21/0601 |
| | | | | 482/98 |
| 2009/0247369 | A1 * | 10/2009 | Chang | A63B 21/06 |
| | | | | 482/49 |
| 2010/0178981 | A1 * | 7/2010 | Holcomb | A63F 13/98 |
| | | | | 463/37 |
| 2010/0229682 | A1 * | 9/2010 | Chung | B22F 1/0059 |
| | | | | 75/230 |
| 2011/0009247 | A1 * | 1/2011 | Januszek | A63B 21/0726 |
| | | | | 482/108 |
| 2013/0095984 | A1 * | 4/2013 | Agate | A63B 23/047 |
| | | | | 482/106 |
| 2014/0088223 | A1 * | 3/2014 | Leibler | B29B 17/00 |
| | | | | 523/400 |
| 2017/0259104 | A1 * | 9/2017 | Bradford | A63B 21/0607 |

FOREIGN PATENT DOCUMENTS

| | | |
|---|---|---|
| GB | 2439221 | 12/2007 |
| JP | 2005144068 | 6/2005 |
| WO | WO 2003043705 | 5/2003 |
| WO | WO 2006073230 | 7/2006 |

\* cited by examiner

EXERCISE WEIGHT STRUCTURE

RELATED APPLICATIONS

This application is a continuation application of U.S. application Ser. No. 16/026,186, filed Jul. 3, 2018 (now allowed), which is a divisional of U.S. application Ser. No. 14/348,883, filed Mar. 31, 2014, now U.S. Pat. No. 10,040,259, which is a national phase application filed under 35 USC § 371 of PCT Application No. PCT/GB2012/052412 with an International filing date of Sep. 28, 2012, which claims the priority of GB Patent Application GB1116781.4, filed Sep. 29, 2011. Each of these applications is herein incorporated by reference in their entirety for all purposes.

FIELD OF THE INVENTION

The present invention relates to an exercise weight structure, and in particular an exercise weight structure that may be used as a free weight disc or as a weight body for a dumbbell, barbell or other handle exercise device.

BACKGROUND OF THE INVENTION

A known exercise device including a weight body structure is disclosed in EP1867365. In the arrangement disclosed in this prior art document an inner weight section or core body of cast iron is cast about an axial securing sleeve. The sleeve provides an interference fit between the weight body and the end of a bar handle. An outer skin of rubber or polyurethane is subsequently molded around the exterior of the cast iron section. EP 867365 describes how an arrangement including a low grade cast iron core body cast around an axial securing sleeve can provide an improved arrangement. The present invention addresses other issues.

Typically the cast iron used for weight bodies is of low grade or quality enabling the manufactured weight structures to be priced sufficiently economically. Due to the materials used, the weight tolerances for these low to mid-range free weight products are wide, and not as tight as those used in competition or high quality Olympic discs which are generally manufactured from steel, which provides better weight accuracy but is more expensive.

The processing of Cast Iron involves very high temperatures, which requires large amounts of energy and also requires the use of sand-based molding processes that are, by their nature, very dirty and unpleasant to use.

Also, the cost of transportation by ocean freight of weight based products over long distances is becoming more expensive and is not considered to be environmentally friendly where large tonnages are concerned. It is more ideal to manufacture as close to the end consumer as possible. However, in the case of Cast Iron based free weights this is often not possible because of the associated local high labor costs and the unpleasant nature of the process.

One additional requirement in the production of freeweights is the use of rubber (usually black) to cover the low grade Cast Iron so that in can be used in clean and user friendly environments, such as modern gyms or homes. The rubber based coverings are more tactile and will not damage equipment, delicate floorings, or furnishings in the way that metal products would. The process of coating the freeweights in rubber also consumes energy and is a dirty and unpleasant process.

Therefore, for reasons identified above, it would be more desirable if a cleaner process, requiring very little energy and providing greater weight accuracy could be utilized. Such a process would allow for reduced costs and for the manufacturing plant to be brought closer the end user.

SUMMARY OF THE INVENTION

The invention is as defined in the appended claims.

According to one aspect the invention provides a method of producing an exercise weight structure from particulate material mixed with a binder material and molded to the appropriate shape. The invention also provides an exercise weight structure so produced.

According to another aspect, the invention provides a method of producing an exercise weight structure by means of first forming an outer skin for the exercise weight structure of a resilient material, the outer skin forming a mold into which an inner weight section or body is molded or cast.

The first and second aspects are not mutually exclusive and indeed may beneficially be combined such that the invention includes a method of producing exercise weight structure by means of first forming an outer skin for the an exercise weight structure of a resilient material, the outer skin forming a mold into which an inner weight section or body is molded or cast, the inner weight section or body being of recycled material when mixed with a binder material.

In another aspect of the invention there is provided a method of forming an exercise weight structure comprising forming a first outer shell section and a second outer shell section; filling at least one of the outer shell sections with a particulate material mixed with a binder material; combining the outer shell sections to form an enclosure encapsulating and molding the particulate and binder mixture. The inner core defined by the particulate and binder mixture bonds to both outer shell sections thereby fixing the outer shell sections in position relative to each other and the core.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The invention will now be further described by way of example only and with reference to the accompanying drawings, and a flowchart describing the manufacturing process and sequence of operations.

DETAILED DESCRIPTION

Figure 1:
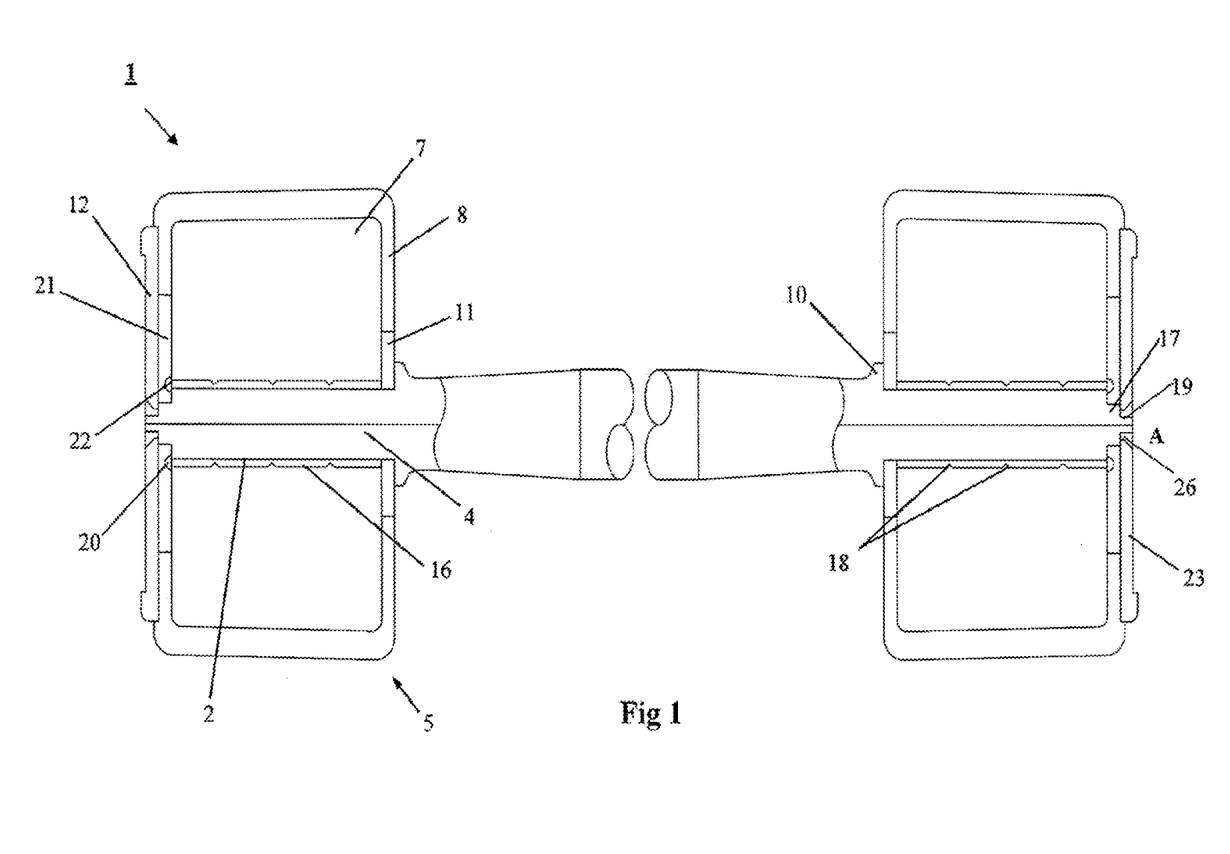
FIG. 1 shows an exercise device utilizing a weight structure in accordance with the invention. In this example, the weight structure is molded around a central bush which may have projections or indentations to assist in securing the bush to the weight structure once it has cured and set. The internal bore of the bush can be machined prior to the molding to provide an interference or sliding fit with the handle.

Referring to FIG. 1, there is shown an exercise device 1 of generally similar construction to the prior art exercise weight structure disclosed in EP1867365, but differing in certain key aspects.

The exercise device 1 of FIG. 1 comprises a bar 3 having end portions 4 at each end. The exercise device 1 further comprises an exercise weight structure 5, which is mounted on an end portion 4 of the bar 3, with a second weight assembly mounted on the opposite end of the bar. The central portion of the bar comprises a handle portion 6. The exercise weight structure 5 is axially retained on an end portion 4 of the bar 3 in one direction by a locating member 10. The locating member 10 may be a projection, such as a flange or a collar. Preferably, a washer 11 is provided between the locating member 10 and the exercise weight structure 5. The washer 11 is preferably formed of hardened steel and acts to distribute the load from the locating member over a wider surface area of the inner surface of the weight assembly, as well as improving the surface contact between the locating member and the weight assembly, thereby reducing any wobble between the bar 3 and the an exercise weight structure 5.

The exercise weight structure 5 comprises an inner weight core 7, and an outer skin 8. In this embodiment both the outer skin and the inner core section are formed from recycled or reclaimed waste material. In the case of the outer skin material, the recycled or reclaimed material may comprise, for example, rubber particulate material such as ground rubber particles or granules of rubber waste from tires or industrial conveyor belts or vehicle timing belts. The rubber particulate material is mixed with a resin binder material, typically a polyurethane resin binder. Typically, the particulate rubber material is provided in a batch and the resin is mixed in the appropriate quantity to provide a paste or sludge with the particles distributed throughout the volume in the binder material. The appropriate mix for the binder to particle volume ratio and the particle size can be arrived at by trial and error. A suitable particle size of rubber particle has been found to be from 180 microns with a range up to and up to 3 mm×20 mm square section. The resin binder needs to be added to the rubber particles in percentages of 7.5% to 20% by weight.

In the case of the inner core material, high density particulate or powdered waste from scrap metal or otherwise can be used to form the inner core. Materials such as magnetite, recycled scrap steel, scrap chilled cast iron, or powdered lead waste (such as from lead batteries) may be used. Non-metallic high density waste may also be used provided the appropriate overall density for the inner core can be arrived at.

The high density particulate or powdered waste material is mixed with a binder material, typically a polyurethane resin binder. Typically the high density particulate or powdered waste material is provided in a batch and the resin is mixed in the appropriate quantity to provide a paste or sludge with the particles distributed throughout the volume in the binder material. The appropriate mix for the binder to particle volume ratio and the particle size can be arrived at by trial and error and is dependent upon the high density waste material used. A suitable metal particle size for the inner core can be between 0.6 mm to 2.4 mm with a resin percentage of 5% to 20% by weight. Heat at low temperatures may be used to accelerate the curing process.

The outer skin 8 protects the inner weight section from damage and corrosion, as well as providing an aesthetically pleasing finish. A central bore 2 is formed in the weight assembly for receiving the end portion 4 of the bar 3. The use of the outer skin 8 in combination with the inner core 7 is not necessary in all embodiments and the invention may extend no further than the use of the inner core 7 formed in accordance with the invention as a an exercise weight structure. Additionally, an inner core of particulate/recycled material held by means of a binder may be provided with an outer skin of a resilient material (e.g. polyurethane or rubber) not comprising particulate material held by a binder. The skin prevents the composite inner core from cracking due to shock impact for example when dropped onto a hard surface.

Where the inner core 7 and outer skin 8 are both formed of waste material it has been found that it may be beneficial to use the same resin binder material for both the outer skin 8 and the inner core 7.

In accordance with an aspect of the invention, an exercise weight structure is produced by means of first forming an outer skin for the an exercise weight structure of a resilient material, the outer skin forming a mold into which an inner weight section is molded or cast.

In practice, this can be achieved by means of lining an appropriately shaped mold cavity with a skin material (which may comprise a sludge or paste of recycled resilient, e.g. rubber granules held by means of a resin binder, e.g. a polyurethane binder). An inner mold block being a facsimile of the core may be introduced into the mold cavity in order to apply pressure to the lining skin layer 8 and mold the internal surface of the lining skin layer to the appropriate shape. The application of pressure in this way also ensures that the required density for the lining skin layer 8 is achieved. Alternatively, it has been found that the natural expansion of the polyurethane material when combined with the binder may be sufficient for the skin material to fill the mold and provide the required skin density.

The inner mold block is then removed and the high density mix for the core 7 (i.e. the high density waste metal material mixed with the resin binder) is then introduced (typically poured) into the mold cavity formed by the inner surface of the outer lining skin 8. The core material is then compressed by the application of a pressure piston or ram and the material is allowed to cure either at ambient temperature, or in an oven at elevated temperature. The resin from the high density mix fuses with the resin in the outer lining skin 8 as it cures and hardens, which provides improved bonding between the skin and the core. In some cases, particularly with larger sizes of dumbbells, it may be necessary to include a third operation in order that the outer face of weight structure 5 can receive an outer covering of resilient material, which is not covered by the end plate 12. In this case, a further layer of lining material is poured into the mold and compressed to provide a partial top coating to the weight structure 5 before the end plate 12 is fitted.

The high density mix for the inner weight core 7 and the resilient material mix for the skin 8 are carefully preprocessed before being introduced into the mold, by weighing and accurately dosing and mixing the constituent materials.

Figure 4:
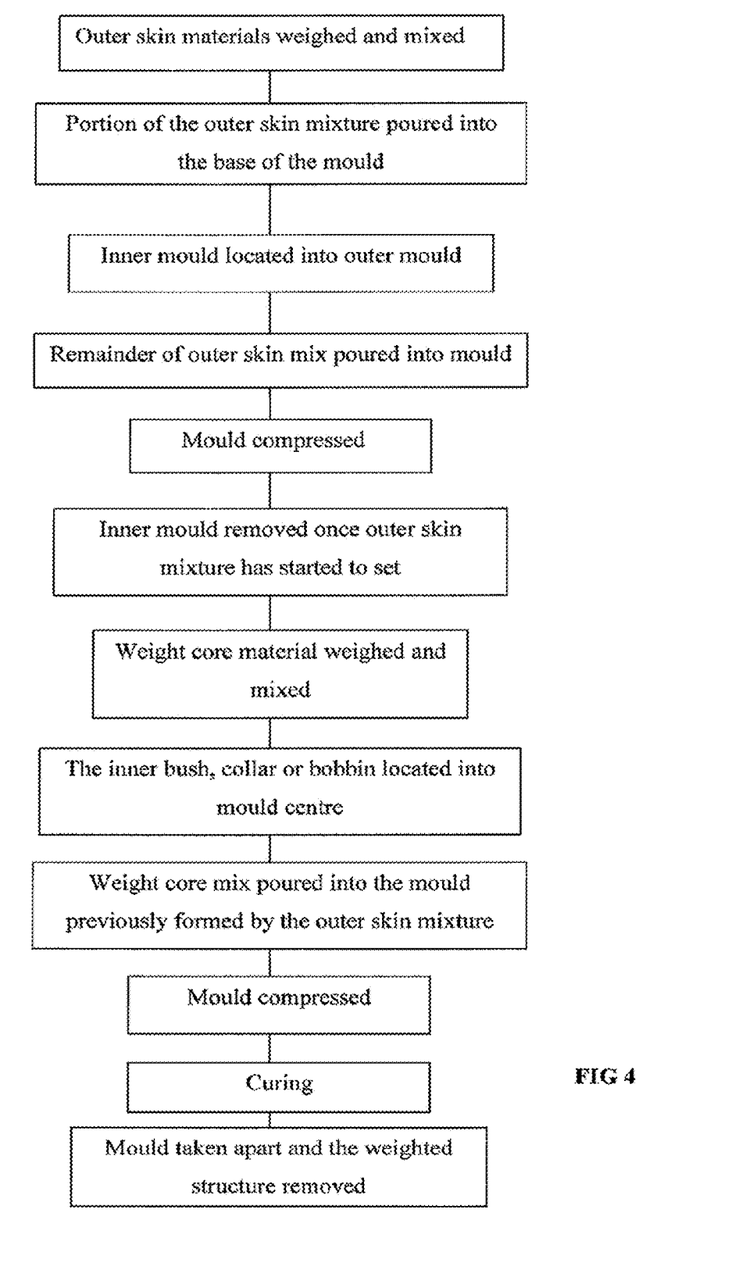
FIG. 4 shows a method of manufacturing a weight for exercise according to an embodiment of the invention.

In an embodiment of the invention, the manufacturing process for a dumbbell comprises the following steps: (1) Outer mold is cleaned and prepared for use; (2) Inner mold (facsimile of the inner weighted core section) is cleaned and prepared for use; (3) Materials for producing the outer skin of the weighted structure are prepared and individually weighed out according to the recommended mix identified below and to the required volume. These material include recycled and granulated polymers and a binding resin; (4) Materials of step 3 are thoroughly mixed together adding any trace accelerators if required; (5) A portion of the resultant mixture is poured into the base of the mold; (6) The inner mold is located into the outer mold; (7) The remainder of the outer skin recycled polymer mix is poured into the mold and compressed for a short period of time; (8) The inner mold is removed once the outer skin mixture has started to set; (9) The materials required to produce the inner section of the weighted structure, including recycled and granulated polymers and binding resin are prepared and individually weighed out according to the recommended mix identified below and to the required volume; (10) The ingredients of step 9 are thoroughly mixed together adding any trace accelerators if required; (11) The inner bush, collar or bobbin is located into the center of the mold; (12) The mixture of step 10 is poured into the mold previously formed by the outer skin mixture; (13) The mold and contents is preferably compressed for a short period of time and the contents left to cure; and (14) The mold is taken apart and the weighted structure comprising of an inner bush, inner weighted section and outer skin is removed.

In an embodiment, a collar 16 is provided internally of the core 7, for receiving the end portion 4 of the bar 3. The collar 16 is located between the end portion 4, and the core 7. The collar 16 is preferably cylindrical, and surrounds the periphery of the end portion 4. Preferably, the collar 16 extends along the entire length of the central bore 2 of the weight assembly 5. The collar is preferably formed from seamless mild steel tubing, but may also be formed from any other suitable material.

The collar 16 may be easily machined to tight tolerances and may be provided with a smooth surface finish. As such, an interference fit may be provided between the end portion 4 and the collar 16, to prevent or limit movement therebetween. In particular, the interference fit prevents relative axial and rotational movement between the end portion 4 and the collar 16. In this way, the collar 16 provides a securing member, which has the advantage of obviating the requirement for threaded fastenings. However, any form of threaded fastening can be used in conjunction with the collar. And the collar may itself be formed with an internal thread which could match with a threaded portion machined into the end portion 4 as an alternative method for fixing.

The collar 16 is provided to prevent movement between the end portion 4 and the weight assembly 5. Therefore, as well as achieving a suitably toleranced fit between the collar 16 and the end portion 4, it is also necessary to ensure that any movement between the collar 16 and the weight assembly 5 is prevented. For the reasons discussed above in relation to the end portion 4, it may not possible to machine a bore in the inner weight core 7 suitable for providing a close fit with the collar 16.

Therefore, the inner weight core 7 is formed by molding around the collar 16 during the molding process. The collar 16 is therefore positioned internally of the mold at least before the high density mix for the core 7 (i.e. the high density waste metal material mixed with the resin binder) is introduced into the mold cavity formed by the inner surface of the outer lining skin 8. As such, the inner weight core 7 forms to the outer surface of the collar 16. The collar obviates the need for subsequent machining of the inner weight core 7. Furthermore, the closest possible tolerance between the collar 16 and the inner weight core 7 is achieved, which prevents lateral movement therebetween.

Figure 3:
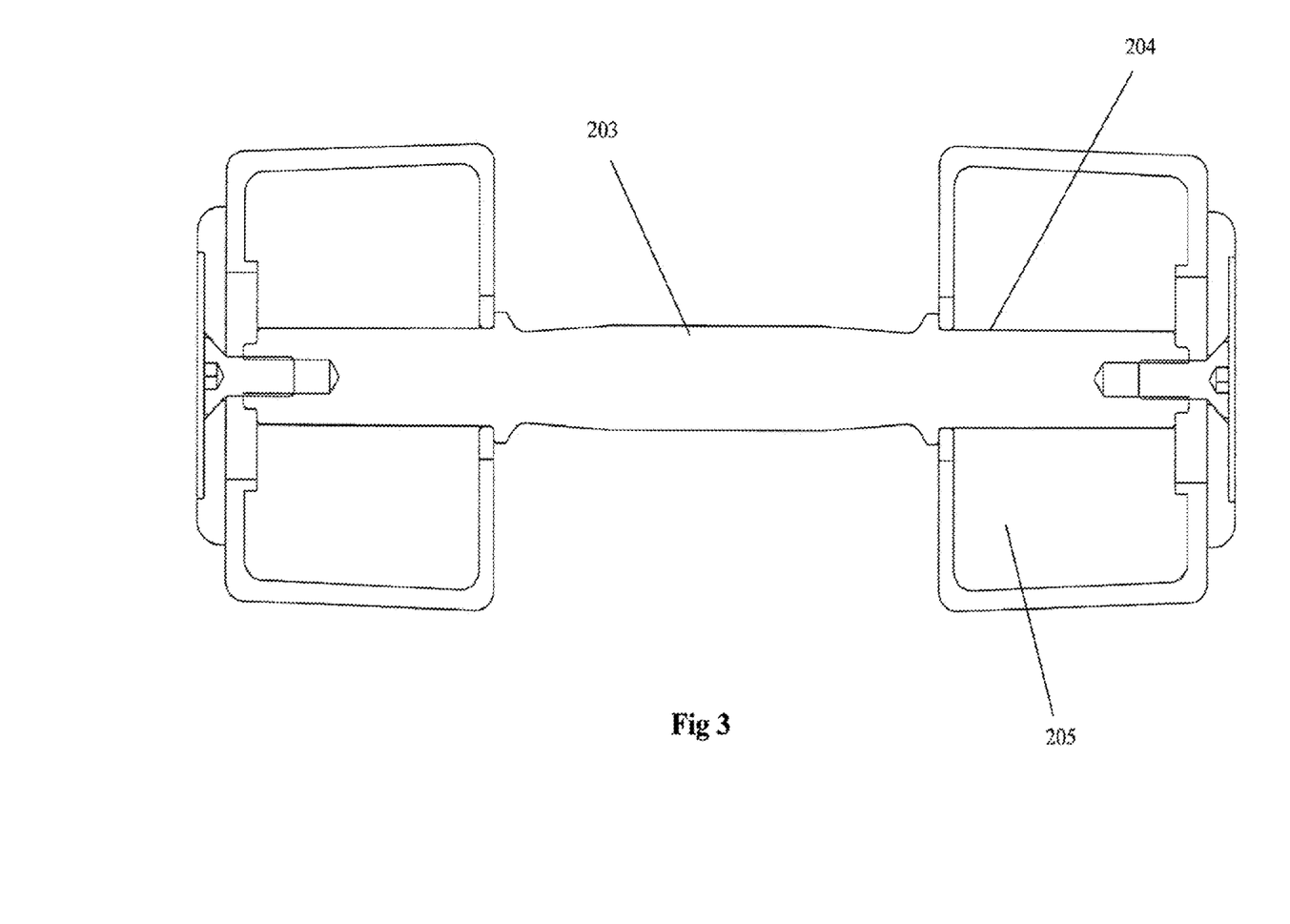
FIG. 3 shows a similar exercise device in accordance with the invention. In this example, the weight structure is molded directly onto the handle.

The collar 16 comprises a longitudinal axis, as shown by line A in FIG. 1. The longitudinal axis of the collar 16 is coaxial with the longitudinal axis of the bar 3 when the weight assembly 5 is mounted on the end portion 4. To prevent relative axial movement between the collar 16 and the weight assembly 5, a portion of the inner weight section 7 extends into the collar 16, or vice versa. Preferably, the collar is provided with one or more keying formations such as at least one annular channel 18. The channel 18 is machined into the outer surface of the collar 16, and preferably extends around its entire periphery. During the molding process, the high density mixture for the weight core 7 penetrates into the channel 18 and solidifies. The inner weight section 7 is thus formed such that a portion of the inner weight section 7 extends into the collar 16. The interaction between the channel 18 and the portion of the inner weight section 7 extending into the collar 16 prevents axial movement between the inner weight section 7 and the collar 16. In the embodiment of the invention shown in FIG. 3, the collar 16 is provided with three channels 18, although such is not essential and other numbers may be provided. The collar 16 may also be provided with channels 18 extending along its length to prevent rotational movement between the collar 16 and the weight assembly 5.

A first securing member is provided to secure the weight assembly 5 to the end portion 4. The first securing member may comprise an end plate 12. The end plate 12 secures the weight assembly 5 to the end portion 4 independently of the collar 16. It is necessary to provide a securing member in addition to the collar, as for all but the lightest of weights, an interference fit is not sufficient to permanently secure a weight on a dumbbell bar. Preferably, the end plate 12, comprises a load bearing plate (not shown), and an outer skin. The outer skin is molded around the load plate in a similar manner to the outer skin 8 of the weight assembly 5.

The end plate 12 further comprises a central aperture 26. The end plate 12 covers a recess 21 in the outer skin 8 of the weight assembly 5, with the peripheral edge of the end plate 12 supported by the outer skin 8. The end plate 12 is further supported about the central aperture by a first projection 17 extending from the end portion 4. Preferably, the first projection 17 is of reduced diameter relative to the end portion 4. A second projection 19, of reduced diameter relative to the first projection 17, extends from the first projection 17 and within the central aperture 26.

The second projection 19 may comprise a bore 15 extending through its center. The bore 15 may extend downwards into the first projection 17, and into the main body of the end portion 4. The bore 15 is provided to receive the spigot 13 of the number disc 9. The disc 9 may be used to display information relating to the weight of the dumbbell, logos, or other information or designs. The spigot 13 extends from the rear surface of the disc 9, and is received by the bore 15. The end plate 12 may comprise a recess 26 for receiving the disc 9, such that the disc 9 is flush with surface of the end plate 12. The disc 9 obscures the weld 20, and second projection 19 from view. In the same way, the end plate 12 obscures the end portion 4 from view.

The end plate 12 is secured to the end portion 4 of the bar 3. In one embodiment, the end plate 12 is secured to the end portion 4 by a weld 22. The weld is formed in the central aperture 26 of the end plate 12, and surrounds the second projection 19. Preferably the central aperture 26 is tapered, or counter-sunk to retain the weld more securely. The weld 26 provides a permanent fixing, and obviates the need for a threaded fastener such a locking nut or a countersunk screw, however, a threaded fastener could be used in applications where welding is not permissible, such as when there is a danger that the resilient coating could be adversely affected by the application of heat at this stage. Previously, it has not been possible to use a weld to permanently fix the weight assembly of a dumbbell, as movement between the end portion of the bar and the weight assembly would result in the weld cracking. However, the present invention provides a collar 16 which is cast into, and fixed relative to, the weight assembly 5, and which provides an interference fit with the end portion 4. As such, movement between the end portion 4 and the weight assembly 5 is prevented, thereby enabling the use of welds as a permanent fixing means. In a further advantage, by obviating the requirement for threaded fastenings, it is no longer required to provide the inner weight section 7 with a recess to accommodate the fastening below the upper surface of the weight assembly 5.

Figure 2:
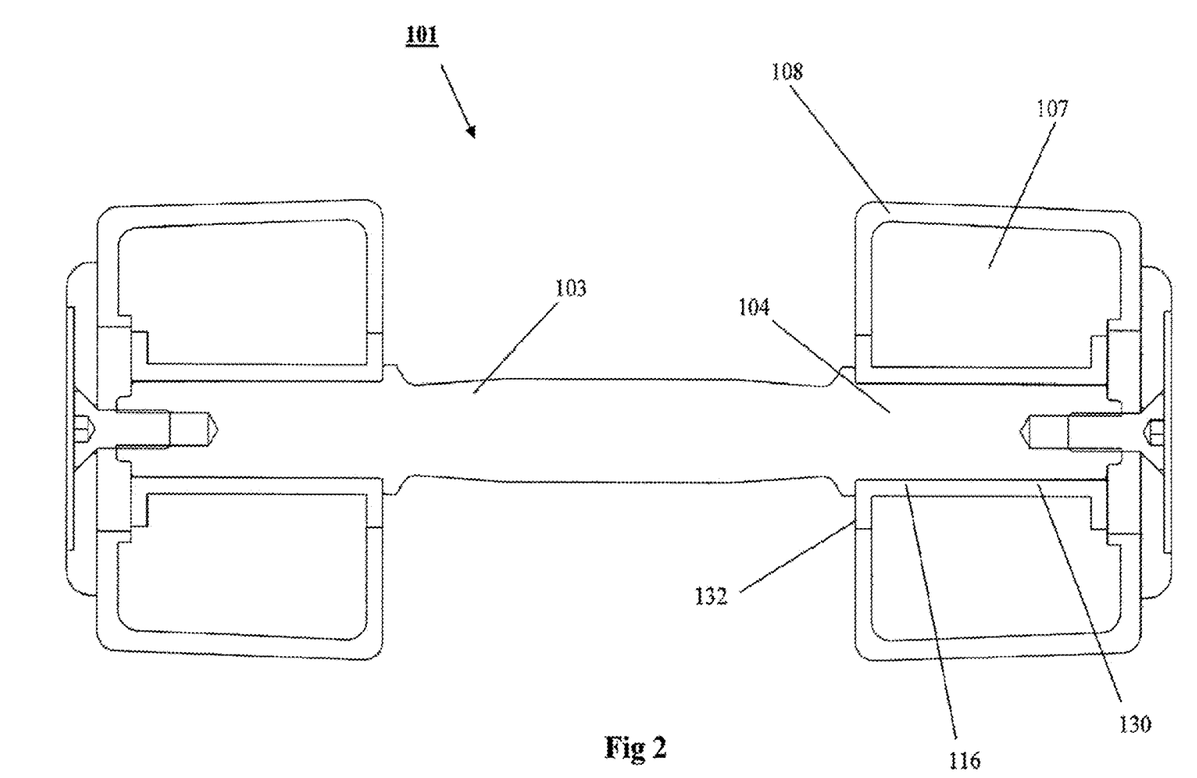
FIG. 2 shows a similar exercise device in accordance with the invention. In this example, the weight structure is molded around a central bobbin constructed as a central bush and two integral side plates or washers. The bobbin helps to strengthen the bore whilst giving some support to the side faces of the weight structure.

In an alternative embodiment shown in FIG. 2, the weight core 107 is molded around a central bobbin 116, which replaces the collar 16 of the previous embodiment. The bobbin 116 comprises a central bush 132 and end plates or flange sections 132 at either end. The end plates 132 are integrally formed with the bush 120. The bobbin 116 obviates the requirement for a separate washer and helps to strengthen the bore whilst giving some support to the side faces of the weight structure. In addition, the bobbin 116 improves the molding process by preventing flow of core material into the cavity defined by the outer skin 108 on the inner face of the weight section 105. In a yet further arrangement shown in FIG. 3, the weight core 205 may be molded directly to the end portion 204 of the bar 203.

Figure 5:
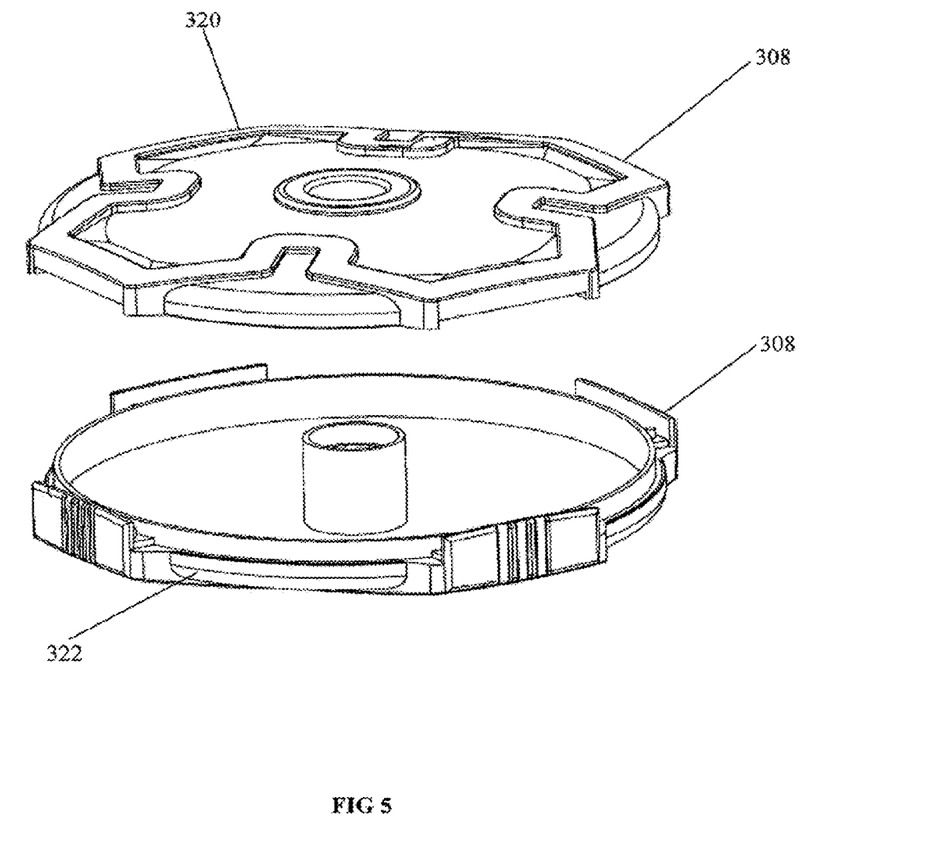
FIG. 5 shows a two part outer shell formed by a molding process according to an embodiment of the invention in preparation to receive the weighted internal material.

In a further embodiment, as shown in FIG. 5, the outer skin 308 is formed as a two part component. In the arrangement shown in FIG. 5, the weight device 300 is a weight disc, but the same may apply to a weight head for a dumbbell. The outer skin 308 includes an upper section 320 and a lower section 322. The upper section 320 and lower section 322 are formed as a 'up' and 'lid' arrangement, with the lower section 322 having a greater depth to receive the majority of the core material and the upper section 320 acting to close off or cap the lower section 322 and having a lesser depth in the axial direction. The upper 320 and lower 322 section may be formed in the same injection molding process as described above, but with the two components having dedicated mold tools. Following formation of the upper and lower sections the core material is poured into the lower section 322, leveled off, and the upper section 320 then applied to close the lower section 322, with the upper 320 and lower sections 322 effectively defining a 'clam shell' type mold arrangement with both sections being retained within their respective molds. The upper and lower sections are then clamped together while the core material cures. The natural expansion of the core material is sufficient to ensure that the mold defined by the outer skin 308 is filled completely, and an additional pressure may be externally applied to assist in the filling operation and to ensure that a required density is achieved. The bonding between the common binder in the core and outer skin materials locks the outer skin to the core and, in combination with the clamping of the outer skin 308, is sufficient to hold the upper 320 and lower 322 shell sections together without a further seam joining operation being required to fuse the two sections.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A exercise weight structure comprising:
   a core formed from a particulate metallic material that is mixed with a binder material and molded to the shape of the exercise weight structure;
   a molded outer skin that is at least partially formed from the same material as the binder material, and
   wherein the molded outer skin is bonded to the binder material of the inner core, and
   wherein the exercise weight structure having an annular body comprising opposing faces and a cutout extending between the opposing faces and the cutout receives a collar to permit mounting of the exercise weight structure on a shaft or bar.

2. The exercise structure of claim 1, wherein the particulate metallic material comprises reclaimed or waste material.

3. The exercise structure of claim 1, wherein the binder material comprises a resin material.

4. The exercise structure of claim 3, wherein the resin binder comprises a polyurethane material.

5. The exercise structure of claim 1, wherein the molded outer skin is resilient.

6. The exercise structure of claim 1, wherein the molded outer skin further comprises a rubber or polyurethane material that is mixed with the binder material.

7. The exercise structure of claim 6, wherein the rubber or polyurethane material comprises a waste material in particulate form.

8. The exercise weight structure of claim 1, wherein the collar is formed from a material that is different to the molded outer skin.

9. The exercise weight structure of claim 1, wherein the collar is bonded to the annular body of the exercise weight structure.

* * * * *